(12) United States Patent
Hoashi

(10) Patent No.: US 6,382,874 B1
(45) Date of Patent: May 7, 2002

(54) RIPARIAN IMPROVEMENT STRUCTURE UNIT

(75) Inventor: Kenpachi Hoashi, Tokyo (JP)

(73) Assignee: Bousai Corporation, Tokyo (JP)

( * ) Notice: Subject to any disclaimer, the term of this patent is extended or adjusted under 35 U.S.C. 154(b) by 0 days.

(21) Appl. No.: 09/559,077

(22) Filed: Apr. 27, 2000

(51) Int. Cl.[7] .......................... A01K 61/00; E02B 3/04; E02B 3/12
(52) U.S. Cl. .......................... 405/25; 405/24; 405/107; 119/221
(58) Field of Search .............................. 405/21, 24, 25, 405/30, 33, 107; 119/207, 208, 221

(56) References Cited

U.S. PATENT DOCUMENTS

| | | | |
|---|---|---|---|
| 465,968 A | * 12/1891 | Neale | 405/25 |
| 761,898 A | * 6/1904 | Neale | 405/25 |
| 3,824,956 A | * 7/1974 | Presley | 119/221 |
| 4,388,019 A | * 6/1983 | Kajihara | 405/25 |
| 4,439,059 A | * 3/1984 | Kikuzawa et al. | 405/25 |
| 4,465,399 A | * 8/1984 | Kikuzawa et al. | 405/32 |
| 4,736,708 A | * 4/1988 | Yoder | 119/208 |
| 5,109,796 A | * 5/1992 | Monus | 119/221 |
| 5,201,136 A | * 4/1993 | LaMorte et al. | 119/221 X |

OTHER PUBLICATIONS

Agardy, Tundi, Issues in Science and Technology: Creating Havens for Marine Life, Fall 1999, p. 37–44.*

* cited by examiner

Primary Examiner—Thomas B. Will
Assistant Examiner—Tara L. Mayo
(74) Attorney, Agent, or Firm—Shanks & Herbert

(57) ABSTRACT

The riparian improvement structure unit for use in construction work for water control and protection is composed of the first tubular member and a plurality of stick-and-twig members tied in a bundle with a bundling member, the first tubular member being formed with a plurality of holes through which to allow fresh water with dissolved oxygen present in water flowing through the first tubular member to pass into spaces and gaps formed within the plurality of the stick-and-twig members. The riparian improvement structure unit may have the second tubular member disposed along and in parallel to the first tubular member and tied together with the first tubular member and the plural stick-and-twig members in a bundle with the bundling member. The riparian improvement structure units are laid on a riverbed or a bottom of a riparian area along or in parallel to a flow of water so as to allow water to flow and pass through and within the riparian improvement structure units.

7 Claims, 6 Drawing Sheets

RIPARIAN IMPROVEMENT STRUCTURE UNIT

CROSS-REFERENCE TO RELATED APPLICATION

The entire disclosure of Japanese Patent Application No 10-307,659 filed on Oct. 28, 1998, including specification, claims, drawings and summary is incorporated by reference in its entirety.

BACKGROUND OF THE INVENTION

1. Field of the Invention

The present invention relates to a riparian improvement structure unit and, more particularly, to a riparian improvement structure unit to be laid in a river, lake or sea, etc., or at the shore or ridge thereof, upon embankment construction for foot protection, river protection, breaking of water, water stream control, etc. Moreover, the present invention relates to such a riparian improvement structure unit that provides a riparian area such as a riverbed bottom, shore, bank, etc. of a river, lake or sea, etc. with the surroundings suitable for habitation and/or growth of aquatic life.

2. Description of the Related Art

Riparian improvement construction work is being carried out in many cases with the major objects to protect the inhabitants of a riparian area of a river, lake or sea, etc. from flood, high tide, etc., in particular upon natural disasters, e.g., flood, etc. In order to achieve the object, the riparian improvement construction is implemented with the measures, for instance, to expand a water passage of a river, etc. or to make a meandering water channel straight so as to allow water to flow faster down to sea, lake, river, etc. and to flatten rapids or deep pool of a river, lake, sea, etc. so as to allow water to flow smoothly.

Conventional riparian improvement work has hitherto been implemented for foot protection, river protection, breaking of water, water stream control, etc. For conventional construction processes, wood materials composed of sticks, twigs, round timber, etc. or stone materials are mainly used. In modern conventional construction processes, concrete blocks, etc. have extensively been used.

The concrete block construction processes can provide the advantages of shortening a period of construction and withstanding a rapid water stream of a river, etc. at a sufficiently high level of resistance because they can prevent the earth and sand on the riverbed from being washed or carried away. This construction process, however, suffers from the drawbacks that concrete blocks change the ecological system of the riparian area and the place where they are laid is no longer inhabitable with aquatic life such as fish, crustaceans, e.g., crabs, shrimps, aquatic insects, etc. and suitable for the growth of aquatic plant, etc.

With the above background, the conventional construction processes that utilize natural materials, such as wooden materials, etc., have again been attracting attention, particularly in terms of providing the surroundings suitable for the habitation and/or growth of such aquatic life. These conventional construction processes utilizing wooden materials, however, had the technical problems that, although bundles of combinations of sticks, twigs, round timbers, etc. are laid on the bottom of a sea, lake, river or the like, spaces among the wooden materials of such bundles become almost flattened by a weight, such as stones, etc., placed thereon in order to prevent them from being carried away, and fresh water containing a sufficient amount of dissolved oxygen can little pass through the spaces so that aquatic life cannot live or grow in them any longer. In addition to these technical problems, they further have suffered from the growing difficulty of collecting wooden materials such as sticks, twigs, round timbers, etc. and have the problems that they require special skills for tightening sticks, twigs, round timbers, etc., into a whole constructed structure and, as a result, a period of construction becomes prolonged and construction costs are made expensive.

SUMMARY OF THE INVENTION

In order to solve the problems prevailing in the conventional construction processes, the present invention has the object to provide a riparian improvement structure unit for use upon foot protection, river protection, breaking of water, water control, and so on, which can improve the riparian area of a river, lake, sea, etc. as well as provide the riparian area with the surroundings suited for aquatic life to live in or grow.

Further, the present invention has the object to provide the riparian improvement structure unit suitable for the habitation and/or growth of aquatic life in the riparian area of a river, lake, sea, etc.

In order to achieve the object, the present invention provides a riparian improvement structure unit that can be disposed on the bottom or side of a riparian area of a sea, lake, rive, or the like, for foot protection, river-bed or bank protection, water breaking, water control, or the like, and that comprises: a first tubular member having a plurality of through holes on its sides; a plurality of stick-and-twig members disposed around the first tubular member; and a bundling member that winds and ties the plural stick-and-twig members and the first tubular member into a bundle.

As the riparian improvement structure units according to the present invention are laid on the bottom or sides of a riparian area in a sea, lake, river, or the like for foot protection, river-bed or river protection, etc., fresh water containing a sufficiently high amount of dissolved oxygen essential for aquatic life can be supplied into the inside of the riparian improvement structure units via the first tubular member. The fresh water supplied into the first tubular members is then allowed to pass through the holes formed round the sides of them into the inside of the stick-and-twig members wound and tied in bundles and to spread into a large number of gaps formed among the stick-and-twig member=the stick-and-twig members wound and tied in bundles around the first tubular member=the first tubular member. The fresh water supplied into the stick-and-twig members is then allowed to spread into a surrounding area in the vicinity of the riparian improvement structures, where structures and cobblestones, etc. are placed, and can provide the surroundings suitable for the habitation and growth of aquatic life.

The first tubular member may preferably be provided with a plurality of partition walls defining the inside into a plurality of inner spaces and each of the partition walls may preferably have an opening that communicates the adjacent inner spaces with each other. The provision of the openings among the partition walls can serve in smoothly flowing fresh water through the first tubular member over its entire length from one end to the other, and the inner spaces defined by the partition walls and communicating with each other via the openings disposed in the partition walls cause turbulence in the flow of water passing through the first tubular member, thereby increasing an amount of the water flowing out through the holes formed in the sides of the first tubular member into the surroundings.

The riparian improvement structure unit according to another embodiment of the present invention may preferably have a second tubular member disposed generally along and in parallel to the first tubular member and wound and tied into a bundle together with the stick-and-twig members and the first tubular member. The second tubular member likewise has substantially the same functions as the first tubular member and it permits a smooth passage of fresh water through the riparian improvement structure unit and a sufficient supply of fresh water into the surrounding area round the riparian improvement structure unit thereby providing the surroundings suitable for the habitation and growth of aquatic life.

In a preferred mode of the present invention, the first tubular member may comprise a tubular member made of a bamboo stem with joints. The partitions at the joints of the bamboo stem can act as partition walls of the first tubular member, and they are provided each with an opening to allow a passage and flow of water therein and therethrough over its entire length from one end to the other. The use of such a natural material, such as bamboo stems, etc., for the first tubular members can provide the surroundings suitable for the habitation and growth of aquatic life. Further, bamboo stems are rich in resources and very cheap in costs because bamboo grows annually and are cut every year. Moreover, the use of bamboo stems can present the advantage in the processing because the bamboo stems can be processed with ease and without difficulty so as to be adapted to the riparian improvement structure units for use with the present invention.

In the preferred mode of the riparian improvement structure units for which the second tubular member is used, the riparian improvement structure unit is configured such that the first tubular member or members is or are arranged in parallel to and along the second tubular member or members and the stick-and-twig members are disposed around the first and second tubular members, and that all the tubular members and the stick-and-twig members are wound and tied into a bundle with a bundling member or members.

In a preferred embodiment, the stick-and-twig member may be composed of a larger-sized stick-and-twig member and a smaller-sized stick-and-twig member and the smaller-sized stick-and-twig member is disposed around the first and second tubular members and the larger-sized stick-and-twig member in turn is disposed around a generally entire or partial circumference of the smaller-sized stick-and-twig member.

Other objects, features and advantages of the present invention become apparent in the course of the description that follows, with respect to the accompanying drawings.

DESCRIPTION OF THE PREFERRED EMBODIMENTS

The present invention will be described in more detail by way of embodiments with reference to the accompanying drawings.

Figure 1:
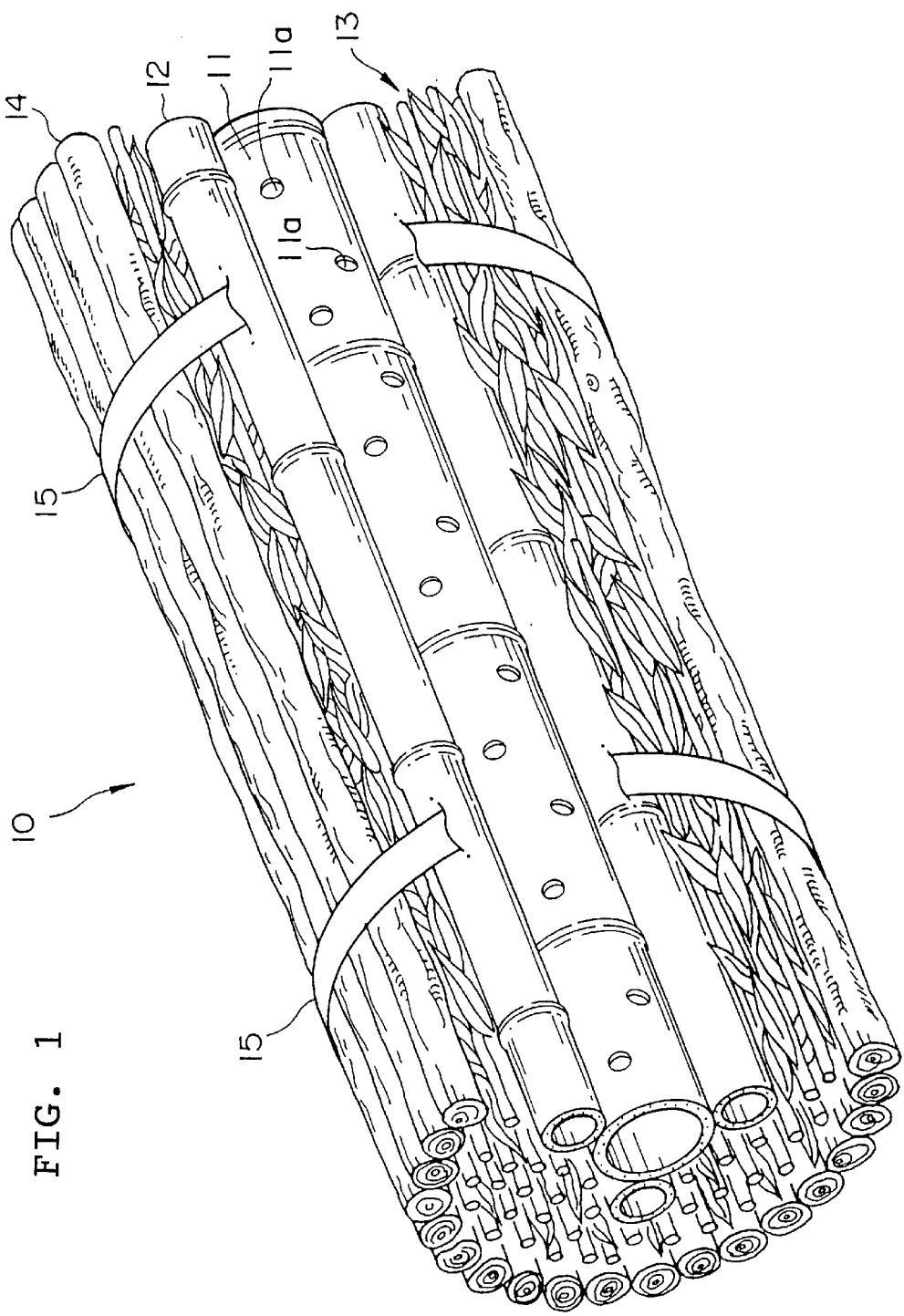
FIG. 1 is a perspective view showing a riparian improvement structure unit in accordance with an embodiment of the present invention.

As shown in FIG. 1, a riparian improvement structure unit 10 according to an embodiment of the present invention may comprise a first tubular member 11, a second tubular member 12, and a stick-and-twig member which may preferably be made of a large number of sticks, twigs and any other natural materials that can provide an inhabitable place for aquatic life. The first and second tubular members are disposed along and in parallel to each other and the stick-and-twig member is disposed around the first and second tubular members and tied into a bundle with a bundling member 15.

Figure 2:
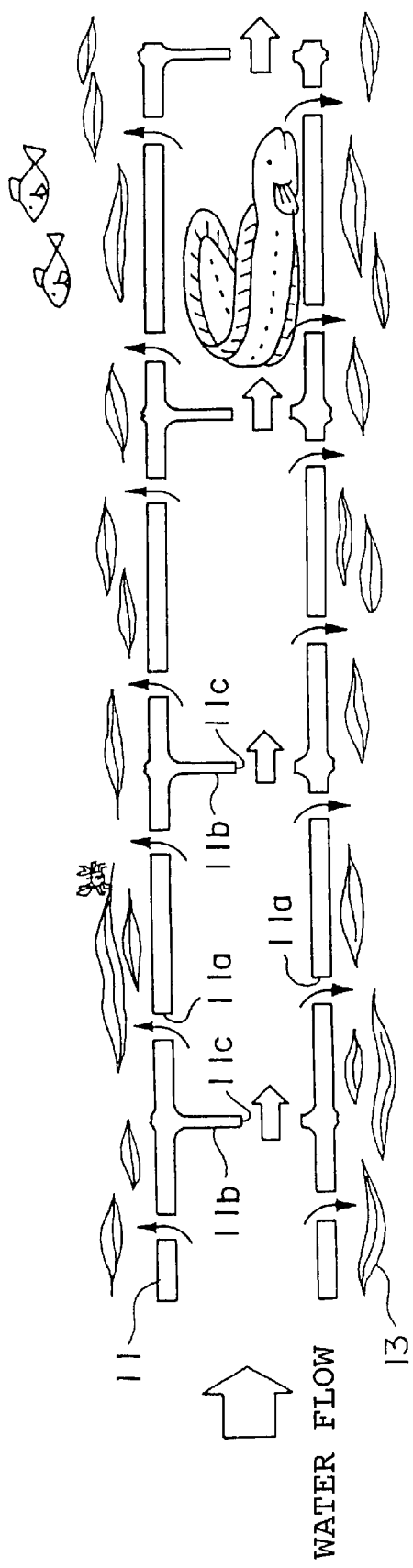
FIG. 2 is a schematic view in section showing a state of water streams flowing through a riparian improvement structure unit laid under water and the inside of the riparian improvement structure unit.
Figure 3:
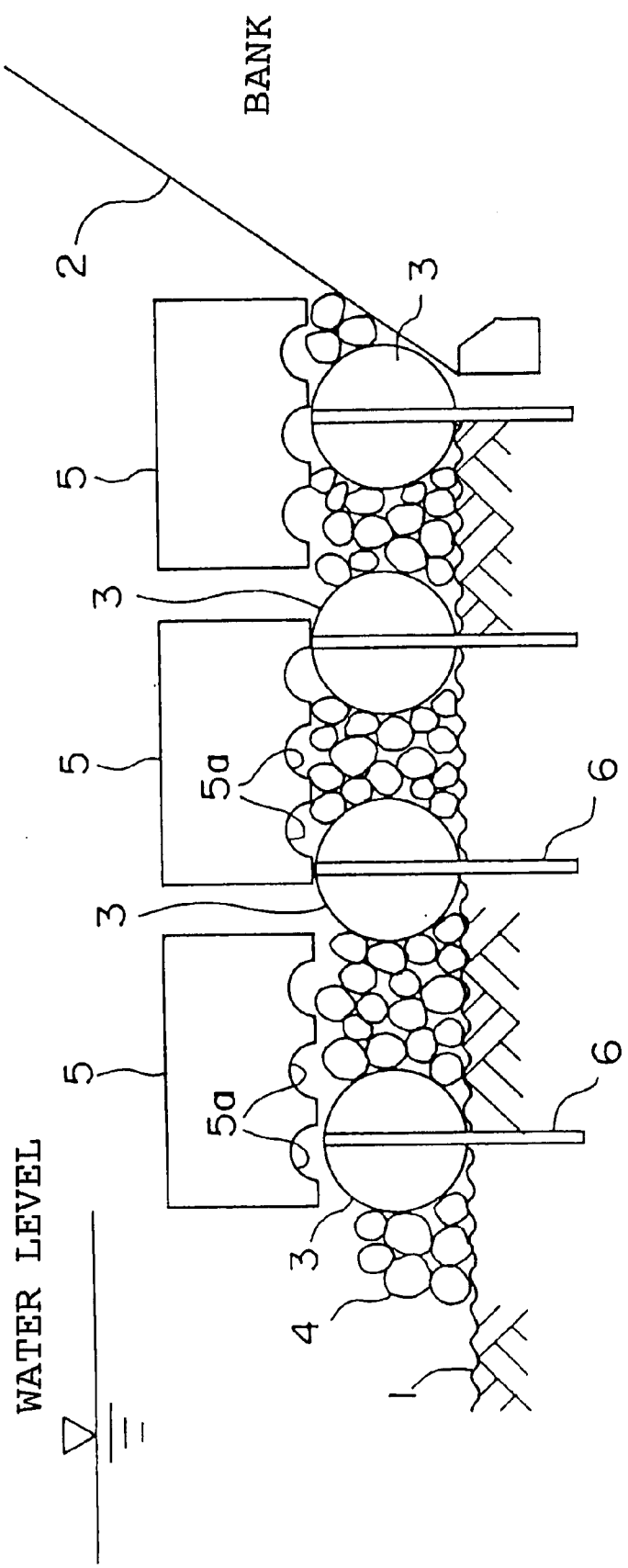
FIG. 3 is a side view in section showing a foot protection structure for a river utilizing riparian improvement structure units according to an embodiment of the present invention, on which foundation blocks are laid as a weight for the riparian improvement structure units.

As shown specifically in FIG. 2, the first tubular member 11 is provided with a number of holes 11a over the entire area of the side thereof, through which fresh water flowing through it can pass to supply the surroundings with a sufficient amount of dissolved oxygen present in fresh water. Moreover, the first tubular member 11 may be provided with partitions 11b having openings 11c through which fresh water can pass over its entire length from one end to the other, supplying a sufficient amount of dissolved oxygen. The inner spaces defined by the adjacent partition members within the first tubular member may cause turbulence in the water streams flowing therethrough, thereby supplying a large amount of water, i.e., dissolved oxygen, to aquatic life. The size and kind of the riparian improvement structure unit may vary with the surroundings such as geographical features of a location, etc. where the riparian improvement structure is to be constructed and with ease of handling, and so on. For the first tubular member 11, bamboo stem may preferably be used, although an artificial member made of vinyl chloride pipe, concrete hollow column, etc. may be used in addition to or in place of the plant member such as bamboo, etc. The bamboo stem can readily be formed with a number of openings 11a in its peripheral side and has a number of partitions or joints 11b at nodes, which can readily be provided with openings 11c. Although the size of the openings is not restricted to a particular one, it is preferred that the openings are large enough for aquatic life to swim therethrough into the inside thereof and too small for large-sized carnivorous fish, etc. to swim therein. In addition thereto, it is preferred from the handling point of view that bamboo stem has a diameter of 60 mm to 100 mm and is cut to a length of about 100 cm to 300 cm, although the size is not restricted to a particular one and it may vary as long as the situation permits. For the riparian improvement structure unit the first tubular member 11 may be one or more.

The second tubular member 12 may be configured in substantially the same manner as the first tubular member 11 and typically it is smaller in size than the first tubular member 11 and it is not necessary to have partitions or joints disposed therein. Furthermore, it is preferred that the size of the second tubular member 12 is large enough to allow small fish or crustacean such as crabs, shrimps, etc. to swim or crawl therein and small enough to prevent large carnivorous fish, etc. from entering therein. The second tubular member 12 may be provided with holes through which fresh water flows. Should the above matters be taken into account, it is particularly preferred to use as the second tubular member bamboo stem having a diameter of 30 mm to 70 mm and cut to a length generally identical to the length of the first tubular member 11. As a matter of course, the size and material may be varied with the situation where the riparian improvement structure is to be constructed. The material for the second tubular member 12 may be substantially equal to that of the first tubular member 11, and it may be an artificial material such as vinyl chloride pipes, concrete hollow pipes, etc., in place of or in addition to natural materials such as bamboo, bushes, etc. For the riparian improvement structure unit the second tubular member 12 may be one or more.

The stick-and-twig member may be composed of sticks and twigs, etc. of plant, including bushes, bamboo, etc., cut to the generally identical length to the first and second tubular members. In a preferred embodiment of the present invention, the stick-and-twig member may be composed of a smaller-sized stick-and-twig member 13 and a larger-sized stick-and-twig member 14, the smaller-sized stick-and-twig member 13 comprising twigs, branches, etc. of bamboo, bushes, etc. and the larger-sized stick-and-twig member 14 comprising sticks, stem, etc. of bushes. The smaller-sized stick-and-twig member 13 may be disposed around the first and second tubular members 11 and 12 and the larger-sized stick-and-twig member 14 may be disposed around the smaller-sized stick-and-twig member 13. The larger-sized stick-and-twig member 14 is in turn wound and tied into a bundle with the bundling member 15 so that the smaller-sized stick-and-twig member and the first and second tubular members are bundled therein. The larger-sized stick-and-twig member 14 is wound and tied into a bundle with the bundling member 15 so as to enclose the first and second tubular members 11 and 12 and the smaller-sized stick-and-twig member 13. The smaller-sized stick-and-twig member 13 has a great number of spaces and gaps and fresh water containing a large amount of dissolved oxygen can be supplied into such spaces and gaps through the holes 11a of the first tubular member 11, so that small aquatic animal and plant can live and grow therein. The kind, sizes, etc. of the larger-sized and smaller-sized stick-and-twig members are not restricted to particular ones.

It is to be understood herein, however, that the structure, size, kind and so on of each of the first and second tubular members and the stick-and-twig members are not restricted to particular ones and they can optionally be varied with the surrounding circumstance where the riparian improvement structure using the riparian improvement structure units is constructed. The above-mentioned constructions of the riparian improvement structure can effectively provide a great number of gaps among the smaller-sized stick-and-twig member. Such gaps can provide a place of habitation, growth and safety for aquatic life.

Figure 5:
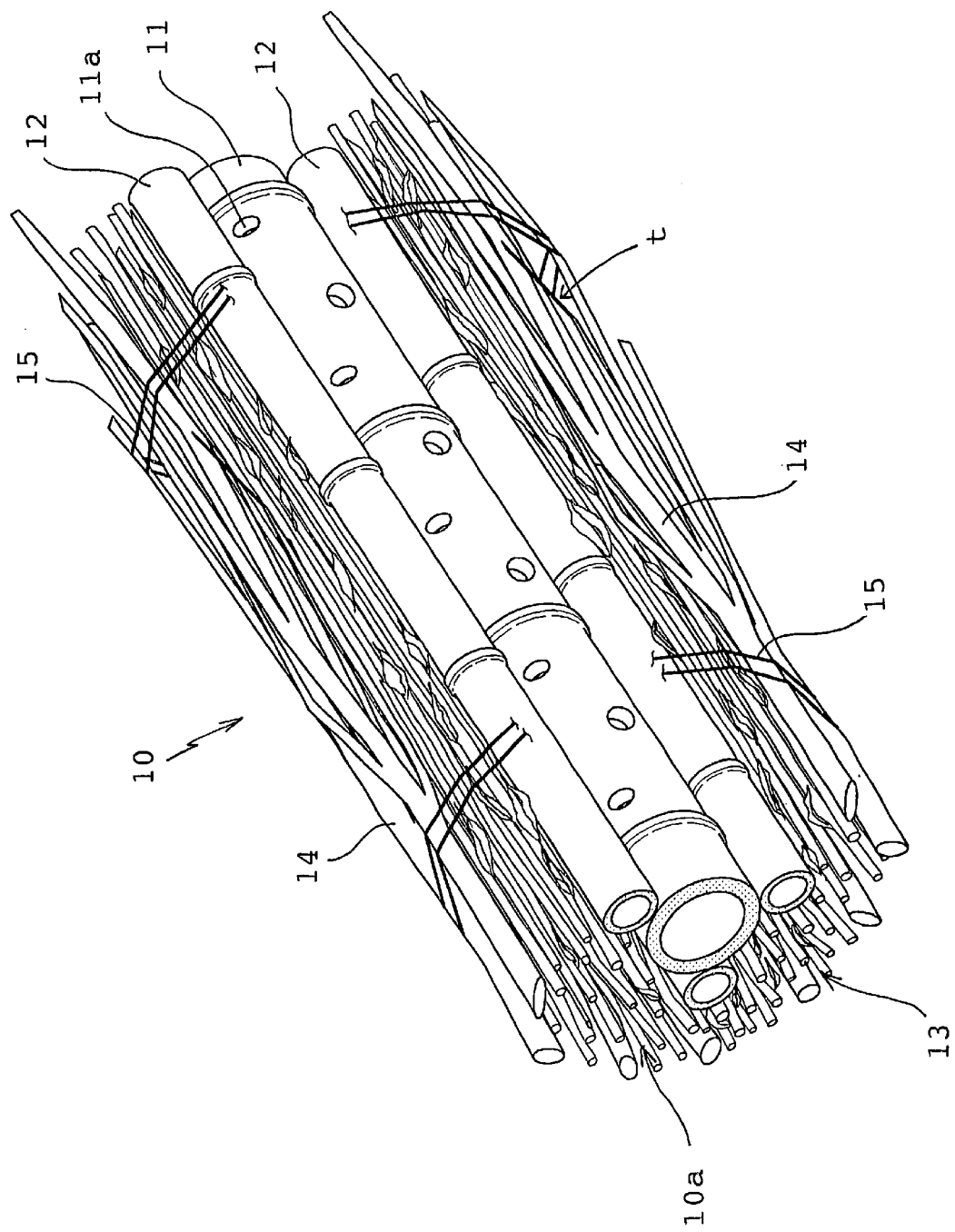
FIG. 5 is a perspective view showing a riparian improvement structure unit in accordance with another embodiment of the present invention.

FIG. 5 shows a second embodiment of the riparian improvement structure unit according to the present invention. As shown in FIG. 5, the riparian improvement structure unit 10 has substantially the same configuration as the riparian improvement structure 10 according to the first embodiment of the present invention. The riparian improvement structure 10 of this embodiment, however, differs from that of the previous embodiment in that the larger-sized stick-and-twig members 14 are disposed sparsely, i.e., in a spaced relationship, around the smaller-sized stick-and-twig members 13 surrounding the first and second tubular members 11 and 12. In this configuration, at least an outer peripheral portion 10a of the riparian improvement structure 10 consisting of the first and second tubular members 11 and 12 as well as the smaller-sized stick-and-twig members 13 may be exposed to water flowing around the riparian improvement structure units 10. Therefore, flowing water containing a large amount of dissolved oxygen can penetrate directly into spaces and gaps t and supply aquatic life inhabiting therein with dissolved oxygen, thereby facilitating the growth of such aquatic life. Therefore, the spaces and gapst formed can be adapted to the surroundings suitable for the habitation and growth of aquatic life, such as small fish, crustaceans, e.g., crabs, shrimps, etc., aquatic insects, and aquatic plant Further, the smaller-sized stick-and-twig members 13 can provide for a place of safety if small aquatic animal escapes from larger-sized carnivorous fish, etc. Moreover, the stick-and-twig member is suitable for spawning.

Like the riparian improvement structure unit 10 according to the previous embodiment of the present invention, the riparian improvement structure unit 10 of this embodiment has the first tubular member 11 together with the second tubular members 12 tied into a bundle, so that dissolved oxygen contained in fresh water passing the first tubular member 10 can be supplied through the holes 11a into the spaces and gape formed within the bundled stick-and-twig members, i.e., the smaller-sized stick-and-twig members 13, in a large amount that is required to feed and grow aquatic life.

Turning now to FIG. 2 which shows the manner of construction of the riparian improvement structure according to the present invention, e.g., for foot foundation construction work, a riparian improvement structure 3 comprises a plurality of the riparian improvement structure units 10 laid on a river-bed 1, cobblestones 4 laid among the riparian improvement structure units 10, and foundation blocks 5 laid on the riparian improvement structure 3, i.e., the riparian improvement structure units 10. In a preferred embodiment, stakes 6 are driven into the riparian improvement structure 3 and the river-bed 1 for support in such a manner that the riparian improvement structures 3 are disposed in a spaced relationship apart from each other in a given distance and the one end of the riparian improvement structure 3 faces the upstream of the river to allow flowing water to readily enter into the hollow tubes of the tubular members and the spaces and gaps of the stick-and-twig members.

The cobblestones 4 are laid so as to fill up the spaces among the riparian improvement structure units 10 in such a manner that they cover the river-bed 1 completely and that the spaces can also provide a good place of habitation and growth of aquatic life and safety therefor.

The foundation blocks 5 may be concrete blocks and play a role as a weight for the riparian improvement structure 3 when they are laid on the river-bed. The foundation block 5 may be provided preferably with a plurality of grooves 5a on the bottom side so as to allow water to pass therethrough when the foundation blocks are laid on the riparian improvement structure 3 for support. In a preferred embodiment, the foundation blocks 5 may be disposed in a spaced relationship apart from one another in a given distance so as to expose a portion of the riparian improvement structure 3 and the cobblestones 4 laid on the river-bed 1 directly to water. In a preferred embodiment, the foundation blocks 5 may be laid in such a manner that the grooves 5a formed on the bottom side are arranged in a direction along and parallel to the direction of the flowing water, thereby forming a passage of water in association with the top of the riparian improvement structure 3 and/or the cobblestones 4 and facilitating the flowing of the water through the passage for supplying the surrounding area with a sufficient amount of dissolved oxygen. This configuration of the riparian improvement structure construction can also serve in supplying fresh water into the spaces and gaps formed among the riparian improvement structure 3 and the cobblestones 4 to provide for the surroundings suitable for the habitation and growth of aquatic life and for safety.

Figure 4:
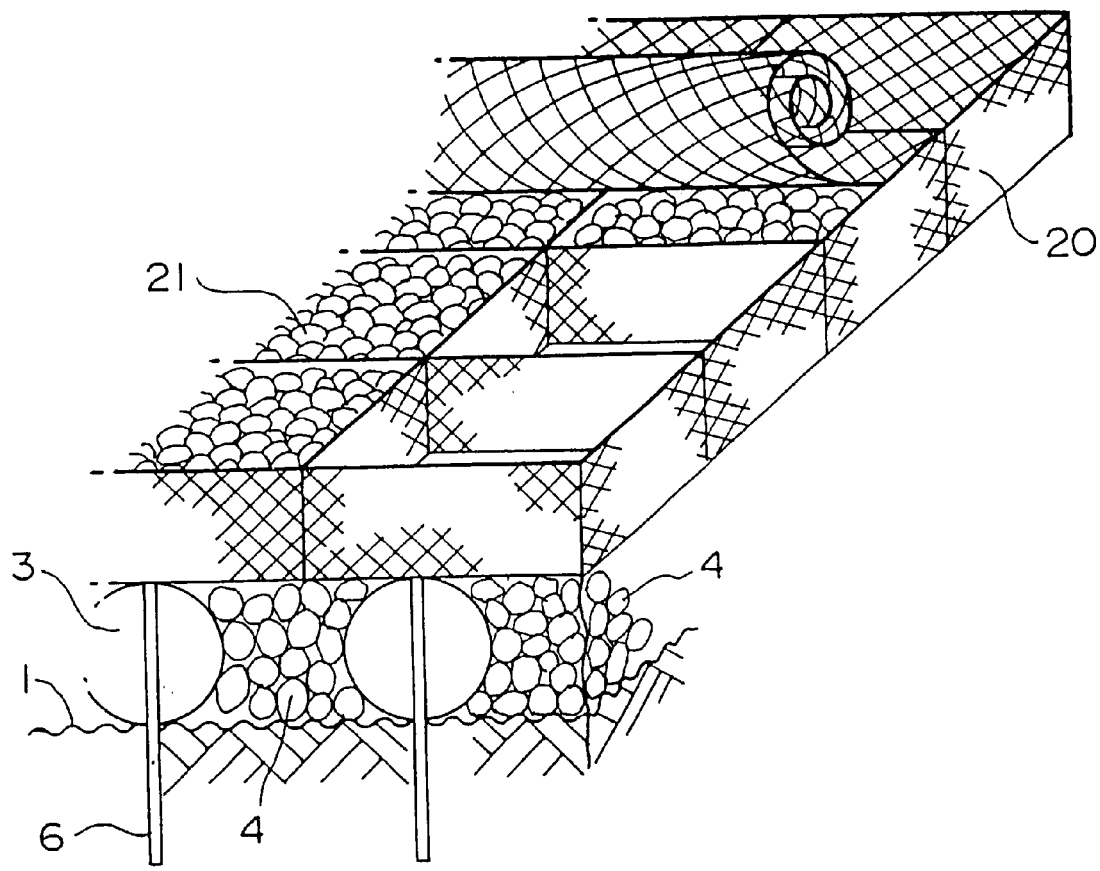
FIG. 4 is a schematic perspective view showing a foot protection structure for a river utilizing a wiring box with cobblestones laid therein, in place of the foundation blocks laid thereon as shown in FIG. 3.

In another embodiment of the present invention, as shown in FIG. 4, a wiring box 20 may be used in place of or in combination with the foundation blocks 5, the wiring box being filled with cobblestones 21. The wiring box 20 with the cobblestones 21 filled therein can provide a place suitable for the habitation and growth of aquatic life as well as play a role as a weight for the riparian improvement structures 3 and the cobblestones 4 laid thereunder.

Figure 6:
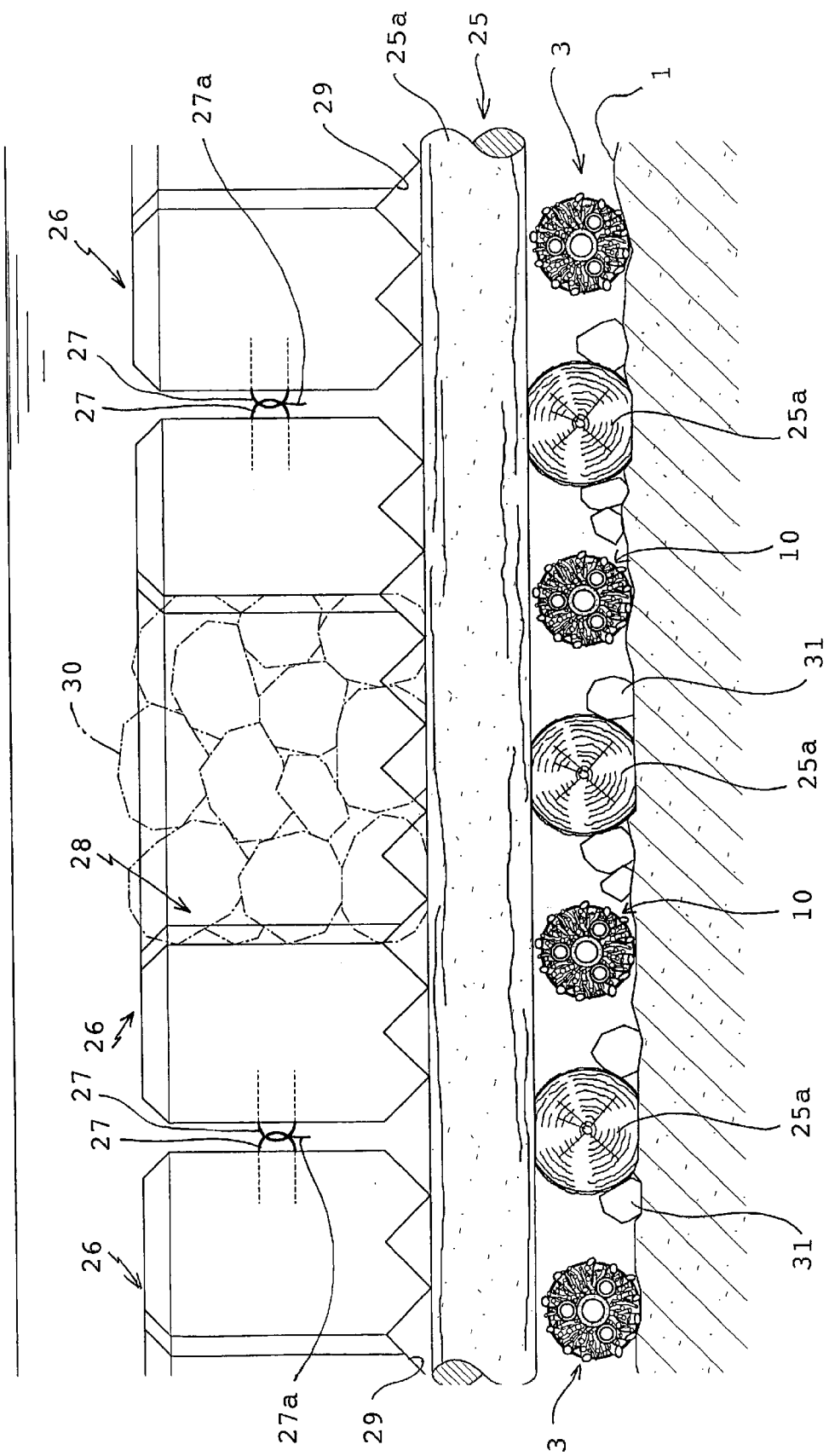
FIG. 6 is a schematic side view in section showing the manner in which riparian improvement structure units according to the present invention and blocks are laid in the water.

In another preferred embodiment of the present invention, for example, as shown in FIG. 6, the riparian improvement structure units 10 are laid on a river-bed 1 in a spaced relationship apart from one another in a given distance so as to provide a space between the adjacent riparian improvement structure units 10. The riparian improvement structure units 10 are disposed in combination with a wooden structure 25 laid on the river-bed 1, the wooden structure consisting of a plurality of timbers 25a. The timbers 25a are also disposed in a spaced relationship apart from one another in such a manner that they are interposed between a pair of the riparian improvement structure units 10 laid on the river-bed. Furthermore, cobblestones 31 may be disposed in the spaces interposed between the riparian improvement structure unit 10 and the timber 25a. Another plurality of the timbers 25a are also laid on the riparian improvement structure units 10 and the plurality of the timbers 25a, both being laid on the river-bed 1. In this embodiment, a one array of the timbers 25a may be laid on the riverbed 1 and another array of the timbers 25a may be laid on the one array thereof in a direction of intersection therewith, thereby forming spaces between the adjacent timbers 25a. In this embodiment, a plurality of foundation blocks 26 may be laid on the array of the timbers 25a disposed on the one array of the timbers. The foundation blocks 26 may be disposed in a spaced relationship apart from one another in a given distance and connected to each other through an anchor 27 and a shackle 27a. Cobblestones 30 may be disposed in the space 28 interposed between the adjacent foundation blocks 26. In a preferred embodiment the riparian improvement structure units 10 and the array of the timbers 25a are laid on the river-bed 1 in such a manner that the riparian improvement structure units 10 are disposed along and in parallel to the direction of the flowing of water and the one respective ends of the riparian improvement structure units 10 and the stick-and-twig members 12 are directed to the upstream side of flowing water to allow a passage of the flowing water through the riparian improvement structure units, particularly through the insides of the first tubular members 11. This configuration of the riparian improvement structure can provide for a place suitable for the habitation and growth of aquatic life.

It is to be understood herein that, although the riparian improvement structure unit according to the present invention has been described by way of examples where the riparian improvement structure unit is used for foot foundation work, the present invention is not intended in any respect to be limited to such work and it should be interpreted as encompassing any other modes of use in construction work for protection and/or control of a riparian area of sea, lake, river, etc. Moreover, it is to be understood that the present invention should be interpreted as encompassing any modification and variation included in the scope and spirit of the present invention.

EFFECTS OF THE INVENTION

The riparian improvement structure unit according to the present invention comprises a combination of the first tubular member with the stick-and-twig members disposed around the first tubular member, the first tubular member and the stick-and-twig members being tied into a bundle with the bundling member. The first tubular member is provided with holes over the entire length of the side through which fresh water can pass into the spaces and gaps formed in the stick-and-twig members and dissolved oxygen contained in fresh water can be supplied to aquatic life, so that the riparian improvement structure unit provides the surroundings suitable for the habitation and growth as well as for safety of aquatic life, such as fish, crustaceans, e.g., crabs, shrimps, etc., aquatic insects, aquatic plants, etc., while protecting or controlling a river-bed, shore, bank, etc. of a river, lake, sea, etc., where the riparian improvement structure according to the present invention is constructed.

The riparian improvement structure unit in a preferred embodiment of the present invention is composed of the first tubular member, the second tubular member and the stick-and-twig member, all members being wound and tied in a bundle with the bundling or tying member, in which the second tubular member can also function as a passage of fresh water through it and it can also provide the inhabitable surroundings for aquatic life, like the first tubular member.

Moreover, the riparian improvement structure unit according to the present invention can use bamboo stem as the first tubular member, so that joints at nodes of bamboo stem can function as partitions and they can be processed readily to form openings therein. Therefore, natural materials such as bamboo stem can be used as the first tubular member and the second tubular member as well as the stick-and-twig members so that the riparian improvement structure unit made of such natural materials can provide the natural surroundings inhabitable for aquatic life. In addition, such natural materials can be readily available at low costs and there is no concern about lacking of such natural resources because they grow annually. Moreover, such natural materials are very low in costs of processing.

What is claimed is:

1. A riparian structure unit for use in construction work for protection and/or control of a riparian area, comprising a first tubular member, a second tubular member and a plurality of stick-and-twig members, said second tubular member and said plurality of stick-and-twig members disposed along and in parallel around said first tubular member, said second tubular member and said plurality of stick-and-twig members wound and tied into a bundle with a bundling member, said first tubular member having a plurality of holes provided in a side wall thereof through which water flowing through said first tubular member passes into spaces and gaps in said stick-and-twig members and supplies dissolved oxygen contained therein to the surroundings inhabitable for aquatic life.

2. A riparian structure unit as claimed in claim 1, wherein said first tubular member has a plurality of partitions disposed within said first tubular member and defining the inside thereof and all of the plurality of partitions are provided with opening through which water passes and flows.

3. A riparian structure unit as claimed in claim 1, wherein said first tubular member comprises bamboo stem and a partition member comprises a joint at each of the nodes on said bamboo stem, said each joint being formed with an opening through which water passes and flows.

4. A riparian structure unit as claimed in claim 1, wherein said first tubular member is disposed along and in parallel to the second tubular member, said plurality of stick-and-twig members disposed around said first tubular member and said second tubular member with said first tubular member disposed in the center, and said first tubular member, said second tubular member and said plurality of stick-and-twig members wound and tied in a bundle with a bundling member.

5. A riparian structure unit as claimed in claim 1, wherein said stick-and-twig members are comprised of a smaller-sized stick-and-twig member and a larger-sized stick-and-twig member, and said smaller-sized stick-and-twig member is disposed around said first and second members and said larger-sized stick-and-twig member is disposed around said smaller-sized stick-and twig member.

6. A riparian structure unit as claimed in claim 5, wherein said larger sized stick-and-twig member is wound and tied into a bundle with said bundling member so as to enclose a substantially entire or partial circumference of said smaller-sized stick-and-twig member.

7. A riparian structure comprising the riparian improvement structure unit as claimed in claim 1, wherein a plurality of said riparian improvement structure units are disposed in a riparian area along the direction of flow of water so as to allow water to pass and flow through said plurality of said riparian improvement structure units.

* * * * *